(12) United States Patent
Matsumoto

(10) Patent No.: US 10,035,382 B2
(45) Date of Patent: Jul. 31, 2018

(54) STUD PIN AND PNEUMATIC TIRE

(71) Applicant: The Yokohama Rubber Co., LTD., Minato-ku, Tokyo (JP)

(72) Inventor: Kenichi Matsumoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 672 days.

(21) Appl. No.: 14/412,098

(22) PCT Filed: Jan. 31, 2014

(86) PCT No.: PCT/JP2014/052325
§ 371 (c)(1),
(2) Date: Dec. 30, 2014

(87) PCT Pub. No.: WO2015/114813
PCT Pub. Date: Aug. 6, 2015

(65) Prior Publication Data
US 2016/0046156 A1    Feb. 18, 2016

(51) Int. Cl.
*B60C 11/16*    (2006.01)
(52) U.S. Cl.
CPC ...... *B60C 11/1643* (2013.01); *B60C 11/1675* (2013.01); *B60C 11/1656* (2013.01)
(58) Field of Classification Search
CPC ............ B60C 11/1643; B60C 11/165; B60C 11/1662; B60C 11/1668; B60C 11/1675;
(Continued)

(56) References Cited

U.S. PATENT DOCUMENTS 3,230,996 A * 1/1966 Hakka .................. B60C 11/16
  152/210
3,693,688 A * 9/1972 Schuman ............ B60C 11/1606
  152/210
(Continued)

FOREIGN PATENT DOCUMENTS

EP    1642753    4/2006
JP    S46-30646    10/1971
(Continued)

OTHER PUBLICATIONS

Machine Translation: JP 2010070052 A; Nakasaki, Keisuke; no date.*

*Primary Examiner* — Steven D Maki
*Assistant Examiner* — Kendra Ly
(74) *Attorney, Agent, or Firm* — Thorpe North & Western

(57) ABSTRACT

A stud pin configured to be installed in a stud pin installation hole in a tread portion of a pneumatic tire includes a tip end which makes contact with a road surface; and a buried base embedded in the tread portion; pressure from the side surface of the stud pin installation hole on the bottom portion and the trunk portion securing the stud pin. The buried base extends in one direction and includes a flanged trunk portion provided between the bottom portion and the tip portion. The bottom portion includes a plurality of first recesses formed on and along an outer peripheral surface thereof that is in contact with a side surface of the stud pin installation hole. The trunk portion includes a plurality of second recesses formed on and along an outer peripheral surface thereof that is in contact with the side surface of the stud pin installation hole.

18 Claims, 7 Drawing Sheets

(58) Field of Classification Search
CPC ............. B60C 11/1681; B60C 11/1687; B60C 11/1693; B60C 11/16; B60C 11/1606; B60C 11/1637; B60C 11/1656
USPC .......................................... 152/210, 211, 212
See application file for complete search history.

(56) References Cited

U.S. PATENT DOCUMENTS

| | | | |
|---|---|---|---|
| 4,919,181 A | 4/1990 | Linden et al. | |
| 2004/0163746 A1* | 8/2004 | Eromaki | B29D 30/66 152/210 |
| 2004/0231775 A1* | 11/2004 | Eromaki | B60C 11/12 152/210 |
| 2007/0056666 A1* | 3/2007 | Eromaki | B60C 11/12 152/210 |
| 2008/0060733 A1* | 3/2008 | Eromaki | B60C 11/12 152/210 |
| 2011/0146865 A1 | 6/2011 | Durat et al. | |
| 2012/0227880 A1 | 9/2012 | Pons | |
| 2013/0000807 A1 | 1/2013 | Pons | |

FOREIGN PATENT DOCUMENTS

| | | |
|---|---|---|
| JP | S48-27506 | 4/1973 |
| JP | S58-129206 | 9/1983 |
| JP | S62-173306 | 7/1987 |
| JP | H01-502178 | 8/1989 |
| JP | 2011-521829 | 5/2008 |
| JP | 2010-070052 | 4/2010 |
| JP | 2010-095212 | 4/2010 |
| JP | 2010070052 A * | 4/2010 |
| JP | 2012-131351 | 7/2012 |
| JP | 2013-180641 | 9/2013 |
| WO | WO 2012/004452 | 1/2012 |
| WO | WO 2012/117962 | 9/2012 |

* cited by examiner

STUD PIN AND PNEUMATIC TIRE

TECHNICAL FIELD

The present technology relates to a stud pin that may be installed in the tread portion of a pneumatic tire, and to a pneumatic tire equipped with the stud pin.

BACKGROUND

Snow tires are traditionally equipped with stud pins installed in the tread portion of the tire to allow the tire to grip an icy road surface.

Typically, a stud pin is embedded into a stud pin installation hole provided in the tread portion of the tire. The stud pin broadens a pin bore and is tightly embedded therein so that the stud pin does not fall out of the stud pin installation hole due to braking, driving, or lateral forces received from the road surface while the tire is moving.

Tire spikes (stud pins) are a known implementation of a lighter-weight stud pin that improves performance on icy surfaces (International Patent Application Publication WO/2012/117962). The aforementioned stud pin is provided with a pillar and a pin. The pillar is fitted from one end in a central axis direction into a close-ended hole formed in the tread surface of the tire and attached to the tread surface; and the pin protrudes from the other surface in the central axis direction of the pillar. Removing the portion of the pillar between the other end surface of the circular pillar protruding from the other end surface of and extending along the central axis direction of the pillar and the surrounding surface forms an irregularly shaped pillar that constitutes the pin having cavities.

However, studded snow tires move not only on icy road surfaces;

studded snow tires are also on concrete road surfaces or asphalt road surfaces, which are harder road surfaces compared to icy road surfaces, so the stud pins drop out comparatively frequently.

Even for tires equipped with the above-mentioned stud pins, there are cases where the stud pins often fall out (pin drop) due to the forces on the tire while a vehicle is driving, breaking, or cornering on a concrete or asphalt road. There will be a large amount of pin drop if there is any clawing force applied between the stud pin and the road surface, the clawing force overcomes the force retaining the stud pin in the tread rubber material of the tire. Therefore, there is a demand for further improvement regarding pin drop for these pneumatic stud tires.

SUMMARY

The present technology proposes a stud pin capable of improving the performance of a pneumatic tire on icy surfaces while being less prone to pin drop from the pneumatic tire, and proposes a pneumatic tire equipped with this stud pin.

A first aspect of the present technology is a stud pin installed in a stud pin installation hole in a tread portion of a pneumatic tire.

The stud pin includes:

a tip end protruding from the tread portion to make contact with the road surface; and a buried base including a flanged bottom portion provided on the end opposite the tip end and extending in one direction; a flanged trunk portion provided between the bottom portion and the tip portion; the buried base being embedded in the tread portion of the pneumatic tire in which the stud pin is installed, and pressure from the side surface of the stud pin installation hole on the bottom portion and the trunk portion securing the stud pin.

The bottom portion includes a plurality of first recesses formed on and along an outer peripheral surface thereof that is in contact with the side surface of the stud pin installation hole; and the trunk portion includes a plurality of second recesses formed on and along an outer peripheral surface thereof that is in contact with the side surface of the stud pin installation hole.

The first recesses provided on the bottom portion and the second recesses provided on the trunk portion are provided at the same peripheral position as the outer peripheral surface of the buried base.

It is preferable that at least one cavity is formed along the periphery of the outer peripheral surface for the outer peripheral surface of the tip end; and the cavity, the first recesses, and the second recesses are formed at the same peripheral position on the outer peripheral surface of the tip end and the outer peripheral surface of the buried base.

Additionally, it is preferable that a first projection is formed between the first recesses on the periphery on the outer peripheral surface of the bottom portion of the buried base, and a shape of the first projection along the bottom portion is either the same as half the maximum size of the bottom portion in a width direction orthogonal to an extending direction of the buried base, or, and a first arc larger than half the maximum size with a radius of curvature of $R_1$.

It is preferable that the shape of the first recesses along the outer peripheral surface is a third arc, and a radius of curvature $R_3$ of the third arc is larger than the radius of curvature $R_1$ of the first arc.

It is preferable that a length of the first recesses along the outer peripheral surface is greater than a length of the first projections along the outer peripheral surface of the buried base.

It is also preferable that a second projection is formed between the second recesses on the periphery on the outer peripheral surface of the trunk portion of the buried base, and a shape of the second projection along the trunk portion is the same as half the maximum size of the trunk portion in the width direction orthogonal to the extending direction of the buried base, or, and a second arc larger than half the maximum size with a radius of curvature of $R_2$.

It is preferable that the shape of the second recesses along the outer peripheral surface is a fourth arc, and a radius of curvature $R_4$ of the fourth arc is larger than the radius of curvature $R_2$ of the second arc.

It is preferable that a length of the second recesses along the outer peripheral surface is greater than a length of the second projections along the outer peripheral surface of the buried base.

It is preferable that the maximum size $L_1$ of the bottom portion in the width direction orthogonal to the extending direction of the buried base is greater than the maximum size $L_2$ of the trunk portion in the width direction, and a minimum size $L_4$ of the bottom portion in the width direction orthogonal to the extending direction of the base is greater than a minimum size $L_5$ of the trunk portion in the width direction.

It is also preferable that the maximum size $L_2$ of the trunk portion is greater than the minimum size $L_4$ of the bottom portion.

It is preferable that a ratio $L_1/L_2$ of the maximum size $L_1$ of the bottom portion in the width direction to the maximum size $L_2$ of the trunk portion in the width direction orthogonal to the extending direction of the buried base is greater than 1.0 and less than or equal to 1.5.

It is preferable that a ratio $L_2/L_3$ of the maximum size $L_2$ of the trunk portion in the width direction to the maximum size $L_3$ of the tip end in the width direction orthogonal to the extending direction of the buried base of the stud pin is not less than 1.5 and not greater than 3.5.

It is preferable that assuming that the extending direction of the buried base of the stud pin is a height direction, a height from a bottom surface of the bottom portion of the buried base opposite the tip end is $H_1$, and a height from the bottom surface to a top end of the bottom portion is $H_2$, a ratio $H_1/H_2$ of the height $H_1$ to the height $H_2$ is 6.0 to 9.0.

Another aspect of the present technology is a pneumatic tire characterized in that the aforementioned stud pin is installed in a stud pin installation hole provided in the tread portion of the pneumatic tire.

In the pneumatic tire, it is preferable that the side surface of the stud pin installation hole abutting the bottom portion of the stud pin installation hole is a cylindrical curved surface on the same periphery as the stud pin installation; and a minimum size $L_4$ of the bottom portion in the width direction orthogonal to the extending direction of the buried base is greater than a diameter of the cylindrical shape of the curved surface abutting the bottom portion of the stud pin installation hole.

It is also preferable that the side surface of the stud pin installation hole abutting the trunk portion of the stud pin installation hole is a cylindrical curved surface along the same periphery as the stud pin installation hole; and a minimum size $L_5$ of the trunk portion in the width direction orthogonal to the extending direction of the buried base is greater than a diameter of the cylindrical shape of the curved surface abutting the trunk portion of the stud pin installation hole.

According to the above described aspects, the stud pin improves the performance of a pneumatic tire on icy surfaces while being less prone to pin drop from the pneumatic tire. Moreover, it becomes possible to provide a pneumatic tire equipped with a stud pin that improves performance on icy surfaces with the stud pin less prone to pin dropping compared to the conventional stud pin.

DETAILED DESCRIPTION (Overall Explanation of the Tire)

Figure 1:
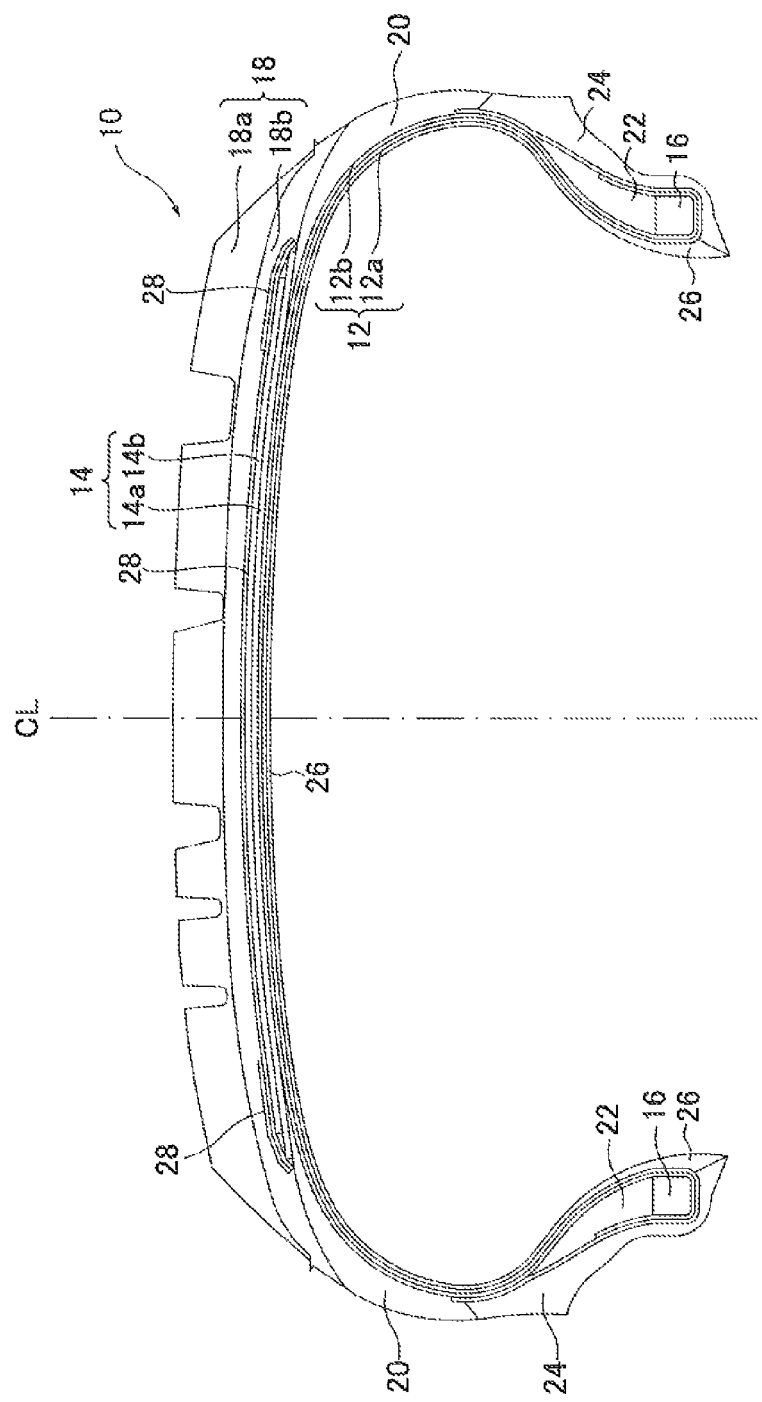
FIG. 1 is a tire cross-sectional view illustrating a cross-section of a pneumatic tire according to a present embodiment of the present technology.

The following is an explanation of the pneumatic tire according to the present embodiment. FIG. 1 is a tire cross-sectional view illustrating a cross-section of a pneumatic tire 10 (hereafter referred to as "tire") according to the present embodiment. The tire 10 is a stud tire with stud pins embedded in the tread portion.

The tire 10 is, for example, a tire for a passenger car. Tires for passenger cars are defined in Chapter A of the JATMA YEAR BOOK 2012 (Japan Automobile Tyre Manufacturers Association, Inc.). In addition, the present embodiment can be applied to tires for small trucks as defined in Chapter B, or tires for trucks and buses as defined in Chapter C.

The specific values of dimensions for various pattern elements provided in the explanation hereafter are example values for passenger vehicle tires. The pneumatic tire dimensions are not limited to these sample values.

The tire circumferential direction offered in the explanation hereafter refers to the rotation direction (both rolling directions) of the tread surface of the tire 10 about a tire rotation axis. The radial direction of the tire refers a direction radiating about a direction extending orthogonal to the tire rotation axis. The outer side in the radial direction of the tire refers to the side away from the tire rotation axis in the radial direction of the tire. The tire width direction refers to a direction parallel to the tire rotational axis direction, and the outer side in the tire width direction refers to the two sides away from the tire center line CL of the tire 10.

(Tire Structure)

The tire 10 includes a carcass ply layer 12, a belt layer 14, and bead cores 16 which serve as a frame. The tire 10 mainly includes a tread rubber member 18, side wall rubber members 20, bead filler rubber members 22, rim cushion rubber members 24, and an inner liner rubber member 26, around these skeleton members.

The carcass ply layer 12 is formed in a toroidal shape wound between a pair of circular ring shaped bead cores 16, and includes rubber coated organic fiber carcass ply members 12a, 12b. In the tire 10 illustrated in FIG. 1, the carcass ply layer 12 is configured from the carcass ply members 12a, 12b, however it may also be configured from a single carcass ply member. The belt layer 14 is provided on the outer side in the tire radial direction of the carcass ply layer 12, configured from two belt members 14a, 14b. The belt layer 14 is made of rubber-coated steel cords arranged at a predetermined angle, for instance, at 20 to 30 degrees relative to the tire circumferential direction. The lower-layer belt material 14a is wider than the upper-layer belt material 14b in the width direction of the tire. The inclination directions of the steel cords of the two layers of the belt members 14a, 14b are opposite each other. Therefore, the belt members 14a, 14b are crossing layers, and they reduce the expansion of the carcass ply layer 12 due to the inflation air pressure.

The tread rubber member 18 is provided on the outer side in the tire radial direction of the belt layer 14, and the side rubber members 20 are connected to the two ends of the tread rubber member 18 to form the side wall portion. The tread rubber member 18 is configured from two layers of rubber member, an upper tread rubber member 18*a* provided on the outer side in the tire radial direction and a lower tread rubber member 18*b* provided on the inner side in the tire radial direction. The rim cushion rubber members 24 are provided at the ends on the inner sides in the tire radial direction of the side wall rubber members 20, and come into contact with a rim on which the tire 10 is fitted. A bead filler rubber material 22 is provided between a portion of the carcass ply layer 12 before the carcass ply layer 12 is wound around the bead cores 16 and a portion of the carcass ply layer 12 after the carcass ply layer 12 is wound around the bead cores 16 to thus be interposed therebetween. The inner liner rubber member 26 is provided on the inner surface of the tire 10 facing the tire cavity region that is filled with air that is enclosed by the tire 10 and the rim.

In addition, the tire 10 includes a belt cover layer 28 made from organic fiber covered with rubber that covers the belt layer 14 from the outer side in the tire radial direction of the belt layer 14.

The tire 10 has this tire structure, but the structure of the pneumatic tire according to the present technology is not limited to the tire structure illustrated in FIG. 1.

(Tread Pattern)

Figure 2:
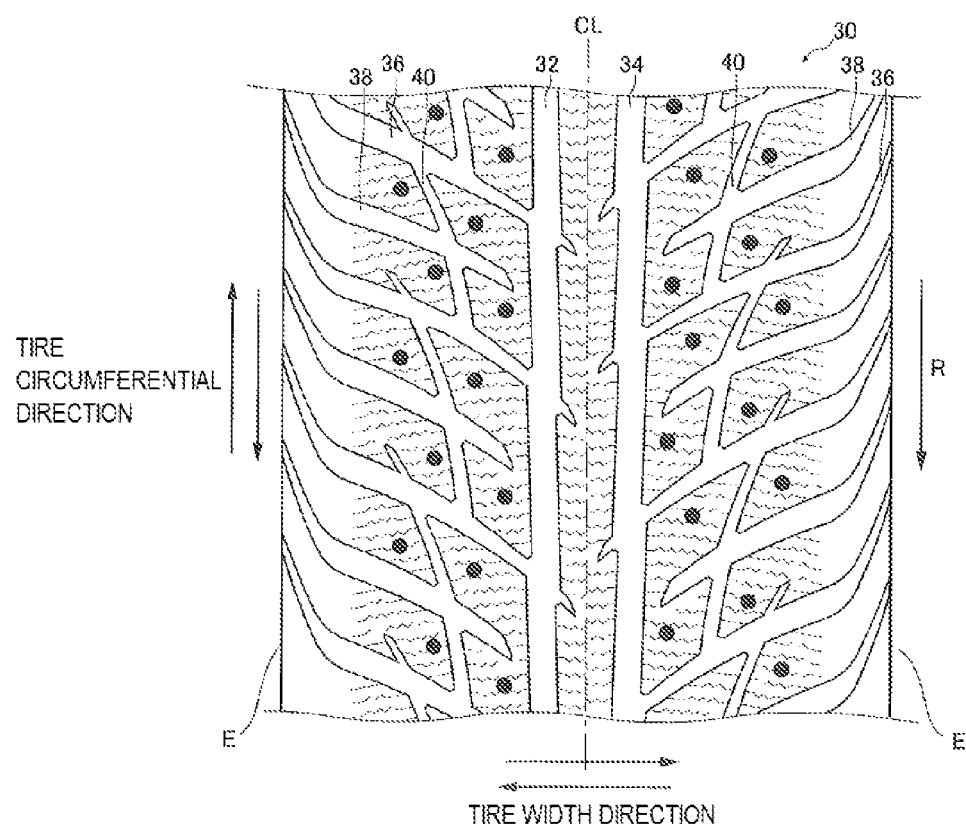
FIG. 2 is a developed plan view of a portion of a tread pattern in which the tread pattern of the tire according to the present embodiment is developed in plan.

FIG. 2 is a developed plan view of a portion of the tread pattern in which a tread pattern 30 of the tire 10 is developed in plan. As illustrated in FIG. 2, the tire 10 has a designated rotational direction R that indicates one direction in the tire circumferential direction. The direction of the rotational direction R is specified by displaying a number or symbol or the like provided on the side wall surface of the tire 10. The stud pin installed in the tread portion is omitted from the illustration in FIG. 2. The stud pin (refer to FIG. 3) is installed in the pin installation hole (the black circle in FIG. 2).

A tread pattern 30 includes circumferential main grooves 32, 34, first angled grooves 36, second angled grooves 38, and third angle grooves 40. A plurality of first angled grooves 36, the second angled grooves 38, and the third angled grooves 40 are formed in the tire circumferential direction (the vertical direction in FIG. 2) at predetermined intervals.

The circumferential main grooves 32, 34 are provided at the same distance away from the tire centerline CL outward in the tire width direction, and extend in straight lines in the tire circumferential direction.

The first angled grooves 36 extend from the region of a tire land portion between the circumferential grooves 32, 34 to a direction opposite the tire rotation direction R (upward in FIG. 2), and extend outward in the tire width direction. The first angled grooves 36 gradually widen as the grooves 36 extend up to the tire shoulder region of the tread portion, and suddenly change angles from the tire shoulder region until reaching the tire circumferential direction; or in other words, the first angled grooves 36 extend towards a direction opposite the tire rotation direction R until reaching a pattern end E.

The second angled grooves 38 extend from inside the land portion outside the main circumferential grooves 32, 34 in the tire width direction in a direction opposite the tire rotation direction R (upward in FIG. 2), and extend outward in the tire width direction. The second angled grooves 38 are formed parallel to the first angled grooves 36. The second angled grooves 38 gradually widen as the grooves 38 extend up to the tire shoulder region of the tread portion, and suddenly change angles from the tire shoulder region until reaching the tire circumferential direction; or in other words, the second angled grooves 38 extend towards a direction opposite the tire rotation direction R until reaching a pattern end E. The second angled grooves 38 are provided between two first angled grooves 36 that are adjacent to each other in the tire circumferential direction.

The third angle groove 40 cuts from first angled grooves 36 to the second angled grooves 38 adjacent thereto in the tire circumferential direction, and further cuts through the first angled grooves 36 next to the second angled grooves 38 in the tire circumferential direction and terminates in the tire shoulder region. The third angled grooves 40 extend in one direction along the tire circumferential direction, that is in a direction opposite the tire rotation direction R (upward in FIG. 2), and extend toward the outside in the tire width direction. The later described stud pin 50 is installed in a stud pin installation hole (the black circle in FIG. 2) within such a tread pattern 30.

The first circumferential main grooves 32, 34, the first angled groove 36, the second angled groove 38, and the third angled groove 40 have a depth of, for example, 8.5 to 10.5 mm, and a groove width of a maximum of 12 mm, for example. The tread pattern illustrated in FIG. 2 is merely one example; the tread pattern for a tire into which a stud pin according to the present embodiment may be installed is not limited to the embodiment illustrated in FIG. 2.

(Stud Pin)

Figure 3:
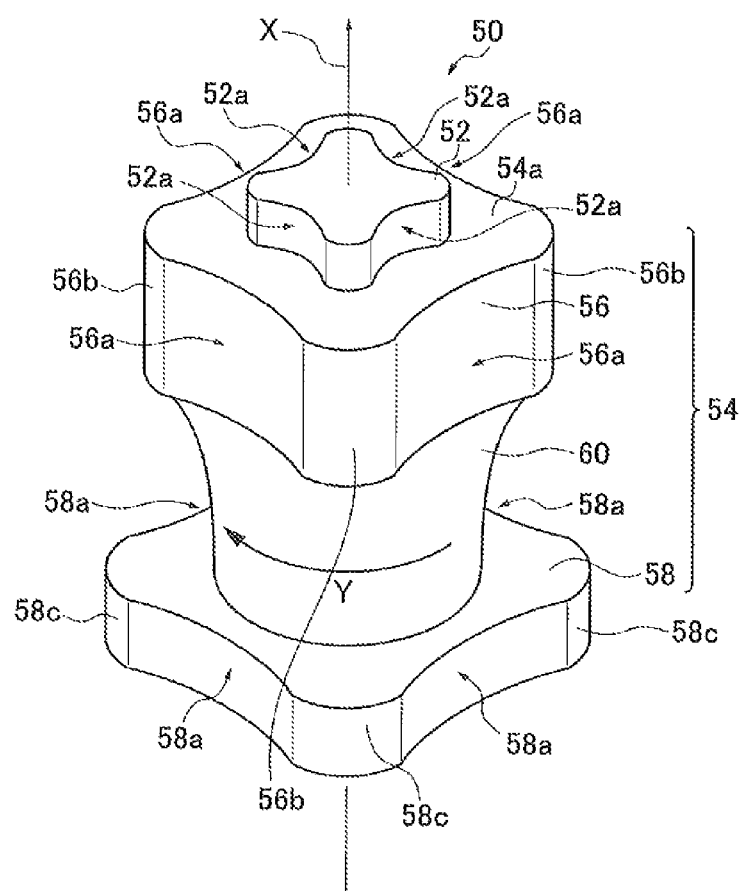
FIG. 3 is an external perspective view of a stud pin according to the present embodiment.
Figure 4A:
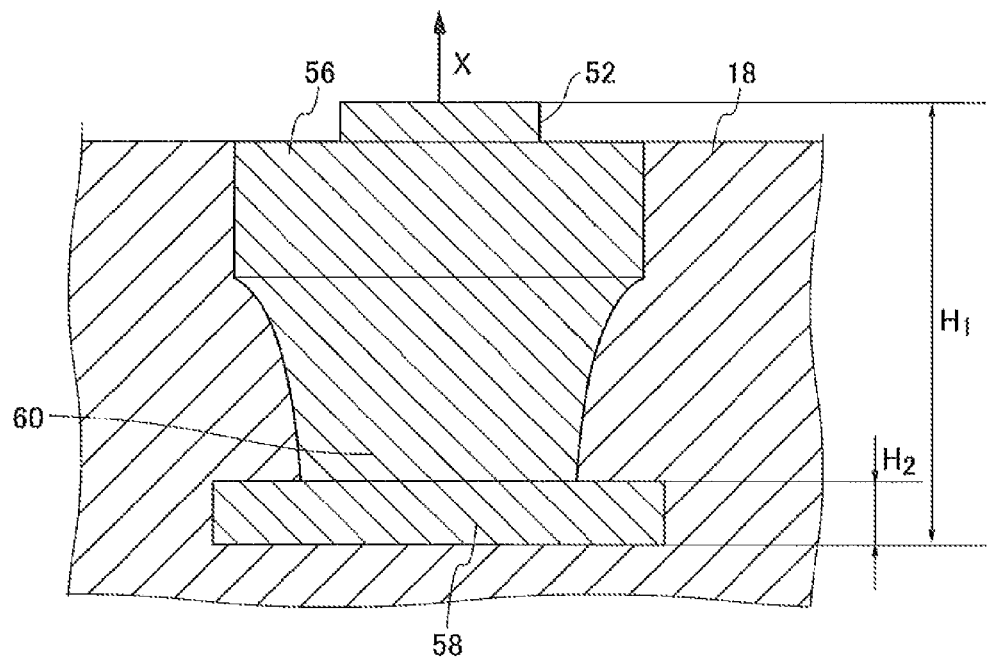
FIG. 4A is a side view of the stud pin according to the present embodiment installed in the tread portion of a pneumatic tire.
Figure 4B:
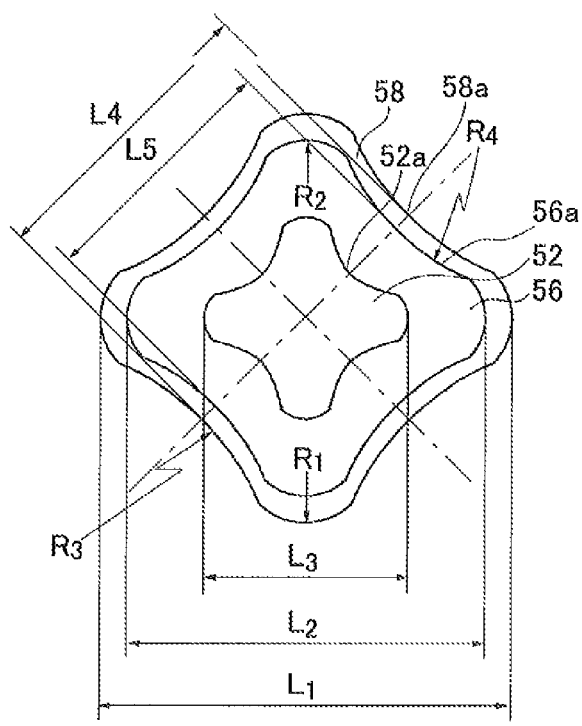
FIG. 4B defines the dimensions of the stud pin according to the present embodiment.

FIG. 3 is an external perspective view of a stud pin 50 according to the present embodiment. FIG. 4A is a side view of the stud pin 50 according to the present embodiment installed in the tread portion of a pneumatic tire. FIG. 4B defines the dimensions of the stud pin 50 according to the present embodiment.

The stud pin 50 primarily includes a tip end 52, and a buried base 54. The buried base 54 is embedded inside the stud pin installation hole in the tread portion of the pneumatic tire in which it is installed. The stud pin 50 is secured to the tire 10 due to the side surfaces of the stud pin installation hole pressing and clamping onto the buried base 54. The buried base 54 is in contact with the tip end 52. The buried the base 54 includes a trunk portion 56, a bottom portion 58, and a shank portion 60. The bottom portion 58 is located at the end opposite the tip end 52. The stud pin 50 is formed from the bottom portion 58, the shank portion 60, and the trunk portion in that order in one direction X. The direction X is the direction in which the buried base 54 extends (the extending direction).

As illustrated in FIG. 4A, when the stud pin 50 is installed in the tread portion, the tip end 52 is the portion of the stud pin 50 that protrudes from the tread surface, comes in contact with the road surface, and claws into the ice. The tip end 52 is a pillar shaped portion protruding from the top end surface of the buried base 54; the cross-section of the pillar includes a hollow 52*a* which is a four sided quadrangle of recesses hollowed out therefrom where the vertices are rounded. That is, the outer peripheral surface of the tip end 52 has four cavities 52*a* formed along the circumferential direction Y of the stud pin 50 (refer to FIG. 3), namely along the outer peripheral surface. In the present embodiment, the four cavities 52*a* are provided on the outer peripheral surface, however, at least one or more, that is, one, two, three, five cavities is preferably formed on the outer peripheral surface.

The trunk portion 56 is a flange located between the tip end 52 and the bottom portion 58, and is in contact with the tip end 52. In other words, the tip end 52 is formed sitting on the top end surface 54*a* of the trunk portion 56. When this stud pin 50 is installed in the tire 10, the trunk portion 56 is embedded inside the tread rubber material 18. The outer peripheral surface of the trunk portion 56, pressed on by the side surfaces of the stud pin installation hole, has a second recess 56a formed thereon; the second recess 56a dips along the circumferential direction Y of the stud pin 50. That is, the second recess 56a is recessed toward the inside in the radial direction orthogonal to the circumferential direction Y. The outer peripheral surface of the trunk portion 56 comes in contact with, and is pressed and clamped onto by the tread rubber material 18, and thus stops the stud pin 50 from moving through fictional force.

To give more detail regarding the trunk portion 56, the cross-section of the trunk portion 56 is shaped such that the cross-section is a substantially quadrangular shape where the four sides and the four rounded vertices form four second recesses 56a. In the present embodiment, there are four second recesses 56a in the outer peripheral surface of the trunk portion, however, at least two or more second recesses 56a, that is two, three, five, or six may be provided thereon. The cross-section of the trunk portion 56 is not necessarily a quadrangular shape with rounded vertices, but may be substantially a triangular, pentagonal, hexagonal or polygonal shape. In the case of a substantially polygonal shape, at least two sides of the polygon may have the second recess 56a. Of course, at least a portion of the substantially polygonal shape, or all of the sides of the substantially polygonal shape, that is, two sides, three sides, four sides, five sides, six sides and the like may be recessed to form a plurality of second recesses 56a.

Second projections 56b are formed projecting outward from between the two second recesses 56a that are next to each other in the circumferential direction Y on the outer periphery of the outer peripheral surface of the trunk portion 56 on the buried base 54. The shape of the second projections 56b along the outer peripheral surface, that is, the cross-sectional shape of the second projections 56b is a second arc having a radius of curvature $R_2$. The radius of curvature $R_2$ is preferably equivalent to half the maximum size $L_2$ of the trunk portion 56 in the width direction orthogonal to the extending direction of the buried base 54; the radius of curvature $R_2$ may also preferably be larger than half the maximum size $L_2$. Generally, the trunk portion 56 is pushed into the circular stud pin installation hole formed in the tread portion of the tire 10; the trunk portion 56 pushes out the tread rubber material 18 as much as the maximum size of the trunk portion 56. Therefore, if the radius of curvature of the trunk portion 56 is larger than half the above-mentioned maximum size, the clamping force acting thereupon from the tread rubber material is a constant distribution along the circumferential direction Y of the second projection portion 56b, or the distribution of the clamping force includes a peak. Thus, this arrangement suppresses rotation of the trunk portion 56 in the circumferential direction Y.

Additionally, the shape of the trunk portion 56 along the outer peripheral surface of the second recess 56a, that is the cross-sectional shape of the second recess portion 56a if the second recess portion 56a were cut along the width direction is a forth arc where the recess is depressed towards the inside of the trunk portion 59. The radius of curvature $R_4$ for the fourth arc is preferably larger than the radius of curvature $R_2$ of the second arc for the second projection 56b. If the radius of curvature $R_4$ of the fourth arc of the second recess 56a in the trunk portion 56 is less than or equal to the radius of curvature of the second arc $R_2$ of the second projection 56b, the second recess 56a in the trunk portion 56 is too deep, so that when the buried base 54 is pressed into the stud pin installation hole, the tread rubber material 18 tends to not be able to progress into the depressed portion of the second recess 56a, and thus less effectively preventing the trunk portion 56 from rotating in the circumferential direction Y.

The length of the second recess 56a along the outer peripheral surface of the trunk portion 56 is preferably greater than the length of the projection 56b along the outer peripheral surface of the trunk portion 56.

The bottom portion 58 is a flange located at the end portion opposite the tip end 52. A first recess 58a is provided at the outer peripheral surface of the flanged bottom portion 58 that is in contact with the stud pin installation hole. More specifically, the cross-section of the bottom portion 58 is a substantially quadrangular shape with rounded corners; the four sides of the substantially quadrangle shape are recessed to form four first recesses 58a. While the cross-section of the bottom portion 58 may be a substantially quadrangular shape with rounded corners, the cross-section of the bottom portion 58 may be a substantially polygonal shape such as a substantially triangular, a pentagonal, or hexagonal shape. In the case of a substantially polygonal shape, at least two sides of the substantially polygonal shape should be recessed to create the first recess 58a. Of course, at least a portion of the substantially polygonal shape, or all of the sides of the polygonal shape, that is, two sides, three sides, four sides, five sides, six sides and the like may be recessed to form a plurality of first recesses 58a.

The first recesses 58a and the second recesses 56a in the bottom portion 58 and in the trunk portion respectively of the buried base 54 are provided at the same peripheral position of the outer peripheral surface of the buried base 54 in the circumferential direction Y. Providing the first recesses 58a on the bottom portion 58, and the second recesses 56a on the trunk portion 56 in this manner thereby improves the pin drop resistance as exemplified in a later described embodiment. The same number of first recesses 58a, and second recesses 56a, are provided in the bottom portion 58 and the trunk portion 56 respectively; both the first recesses 58a and the second recesses 56a are provided on the same peripheral position in the circumferential direction Y on the bottom portion 58 and the trunk portion 56, respectively. To be provided "at the same peripheral position" means that when a radial direction orthogonal to the circumferential direction Y is taken as a reference direction to define azimuth angles on the periphery, the difference between the azimuth angle of the center position of a second recess 56a in the circumferential direction Y, and the azimuth angle of the center position of a first recess 58a in the circumferential direction is not greater than 5°.

Second first projections 58c are formed projecting outward from between the two first recesses 58a that are next to each other in the circumferential direction Y on the periphery of the outer peripheral surface of the bottom portion 58 on the buried base 54. The shape of the second projections 58c along the bottom portion 58, that is, the cross-sectional shape of the second projections 58c is a first arc having a radius of curvature $R_1$. The radius of curvature $R_1$ may be either half of the maximum size of the bottom portion 58 in the width direction orthogonal to the extending direction of the buried base 54, or may be larger than half the maximum size with a radius of curvature $R_1$ when the first projection 58c is cut along the width direction. The radius of curvature $R_1$ is preferably either half of the maximum size of the bottom portion 58 in the width direction orthogonal to the extending direction of the buried base 54, or is preferably larger than half the maximum size. Generally, the bottom portion 58 is pushed into the circular stud pin installation hole provided in the tread portion of the tire 10; the bottom portion 58 pushes out the tread rubber material as much as the maximum size of the bottom portion 58. Therefore, if the radius of curvature $R_1$ of the first projection 58c on the bottom portion 58 is half or greater than half the size of the maximum the above-mentioned maximum size, the clamping force acting thereupon from the tread rubber material 18 is a constant distribution along the circumferential direction Y of the first projection 58c, or the distribution of the clamping force includes a peak. Thus, this arrangement suppresses rotation of the bottom portion 58 in the circumferential direction Y.

Additionally, the shape of the bottom portion 58 along the outer peripheral surface of the first recess 58a, that is, the cross-sectional shape of the first recess 58a if the first recess 58a were cut along the width direction is a third arc where the recess is recessed towards the inside of the bottom portion 58. The radius of curvature $R_3$ for the third arc is preferably larger than the radius of curvature $R_1$ of the first arc for the first projection 58c. If the radius of curvature $R_3$ of the third arc of the second recess 58a in the bottom portion 58 is less than or equal to the radius of curvature of the first arc $R_1$ of the first projection 58c, the first recess 58a in the bottom portion 58 is too deep, so that when the buried base 54 is pressed into the stud pin installation hole, the tread rubber material 18 tends to not be able to progress into the depressed portion of the first recess 58a, and thus less effectively preventing the bottom portion 58 from rotating in the circumferential direction Y.

The length of the first recess 58c along the outer peripheral surface of the bottom portion 58 is preferably greater than the length of the projection 58a along the outer peripheral surface of the bottom portion 58. Providing the length of the first recess 58a along the outer peripheral surface to be greater than the length of the first projection 58c along the outer peripheral surface of the bottom portion 58 more effectively suppresses the rotation of the bottom portion 58 in the circumferential direction Y.

The shank portion 60 connects the trunk portion 56 and the bottom portion 58, and has a smaller cross-section compared to the trunk portion 56 and the bottom portion 58. The cross-section of the shank portion 60 has a circular shape, and no recesses are formed on the outer peripheral surface of the shank portion 60.

The tip end 52 and the buried base 54 may be made from the same metallic material, or from different metallic materials. For instance, the tip end 52 and the buried base 54 may be made from aluminum. The tip end 52 may be made from tungsten carbide, and the buried base 54 may be made from aluminum. If the tip end 52 and the buried base 54 are made from different metallic materials, the tip end 52 is fixed to the buried base 54 by pushing and fitting a projection (not shown) of the tip end 52 into a hole (not shown) of the buried base 54.

Figure 5:
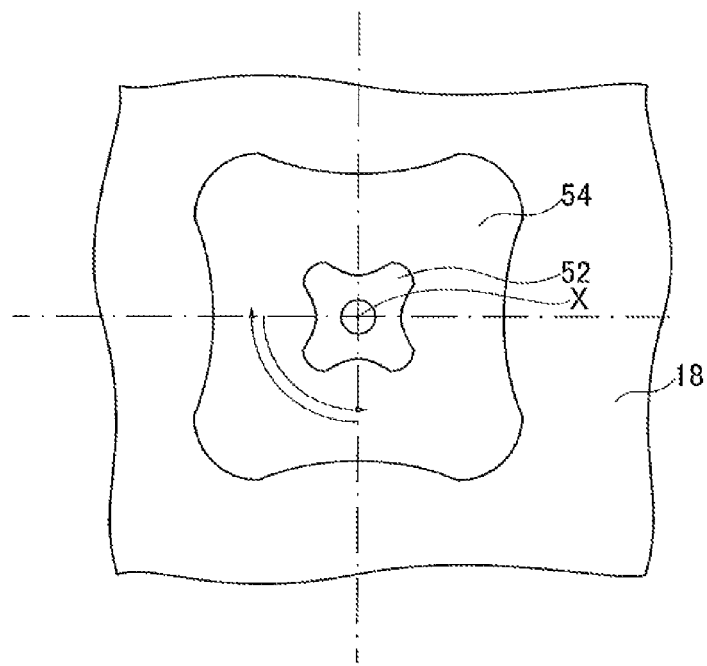
FIG. 5 is an explanatory diagram of the movement of the stud pin according to the present embodiment.

A plurality of recesses may thus be formed in the outer peripheral surface of the buried base 54 on the stud pin 50 in contact with the tread rubber material along the periphery of the outer peripheral surface (along the circumferential direction Y). Therefore, the stud pin 50 installed in the tire 10 is prevented from rotating about the direction X (refer to FIG. 4A) as shown in FIG. 5 when the stud pin 50 is subjected to forces opposite the clawing forces applied by the road surface to the stud pin 50 itself. FIG. 5 is an explanatory diagram of the movement of a stud pin according to the present embodiment. When this movement of the stud pin 50 occurs, the stud pin 50 tends to be easy to pull out from the stud pin installation hole in the same way a cork may be pulled out from a wine bottle. Therefore, in the present embodiment, to prevent movement of the stud pin 50 in the direction illustrated by the arrow in FIG. 5, recesses are formed on the outer peripheral surface of the buried base 54 in contact with the tread rubber material. The cross-section of the stud pin installation hole is much smaller than the cross-section of the stud pin 50; the outer peripheral surface of the stud pin 50 presses against the tread rubber material 18 constituting the side surface of the stud pin installation hole, and the tread rubber material clamps onto the stud pin 50. Therefore, if there are recesses in the outer peripheral surface of the stud pin 50, the tread rubber material enters the recesses. The tread rubber material present in the recesses deters movement of the stud pin 50 in the direction of the arrow illustrated in FIG. 5. At this point, the first recesses 58a and the second recesses 56a in the bottom portion 58 and in the trunk portion respectively of the buried base 54 are provided on the same periphery of the outer peripheral surface of the buried base 54 in the circumferential direction Y. Therefore, the tread rubber material present in the recesses can more effectively deter movement of the stud pin 50 in the direction of the arrow illustrated in FIG. 5.

Assume the direction in which the stud pin 50 extends from the buried base 54 toward the tip end 52 is the height direction (direction X in FIG. 4A), and the direction orthogonal to the height direction is the width direction. The maximum size of the bottom portion 58 in the width direction is $L_1$, the maximum size of the trunk portion 56 in the width direction is $L_2$, and the maximum size of the tip end 52 in the width direction is $L_3$. Also assume the minimum size of the bottom portion 58 in the width direction is $L_4$, and the minimum size of the trunk portion 56 in the width direction is $L_5$.

The maximum size $L_1$ of the bottom portion 58 is preferably greater than the maximum size $L_2$ of the trunk portion 56, and the minimum size $L_4$ of the bottom portion 58 is preferably greater than the minimum size of the trunk portion 56. Establishing such sizes for the bottom portion 58 and the trunk portion 56 in this manner maintains a balanced clamping force from the tread rubber material 18 onto the bottom portion 58 and the trunk portion 56, thus improving the pin drop resistance of the stud pin 50.

When the stud pin 50 enters the stud pin installation hole in the tire 10, if the side surface of the stud installation hole in contact with the bottom portion 58 is a cylindrical curved surface along the periphery of the stud pin installation hole, it is preferable that the minimum size $L_4$ of the bottom portion 58 is greater than the diameter of the above mentioned cylindrical curved surface of the stud pin installation hole. Hereby, the tread rubber material 18 enters into the portion of the first recess 58a in the bottom portion 58, and clamps onto the bottom portion 58, inhibiting the bottom portion 58 from rotating in the circumferential direction Y.

If the side surface of the stud pin installation hole in contact with the trunk portion 56 is a cylindrical curved surface along the periphery of the stud pin installation hole, it is preferable that the minimum size $L_5$ of the trunk portion 56 is greater than the diameter of the aforementioned cylindrical curved surface of the stud pin installation hole in contact with the trunk portion 56. Hereby, the tread rubber material 18 enters into the recessed portion of the second recess 56a in the trunk portion 56, and clamps onto the trunk portion 56, inhibiting the trunk portion 56 from rotating in the circumferential direction Y.

The ratio $L_1/L_2$ of the maximum width $L_1$ to the maximum width $L_2$ is preferably greater than 1.0 and less than or equal to 1.5. The values which may satisfy the above mentioned numerical range for the ratio $L_1/L_2$ may be, for example, $L_1$ in a range of 5.5 to 9.5 mm, and $L_2$ in a range of 5.0 to 9.5 mm. If, however, the ratio $L_1/L_2$ is not greater than 1.0, the pin drop resistance deteriorates. The bottom portion 58 contributes more to deterring rotation of the stud pin 50 compared to the trunk portion 56. Additionally, if the ratio $L_1/L_2$ is greater than 1.5, the clamping force on the stud pin 50 due to the tread rubber material 18 forming the side surface of the stud pin installation hole becomes too strong and thus the stud pin 50 tends to bite into the inside of the tread rubber material 18 (the inner side in the radial direction of the tire). As a result, the protruding length of the tip end 52 is shortened, thus reducing the clawing force of the tip end 52 on an icy surface. The ratio $L_1/L_2$ is preferably from 1.15 to 1.4, inclusive.

Figure 6A:
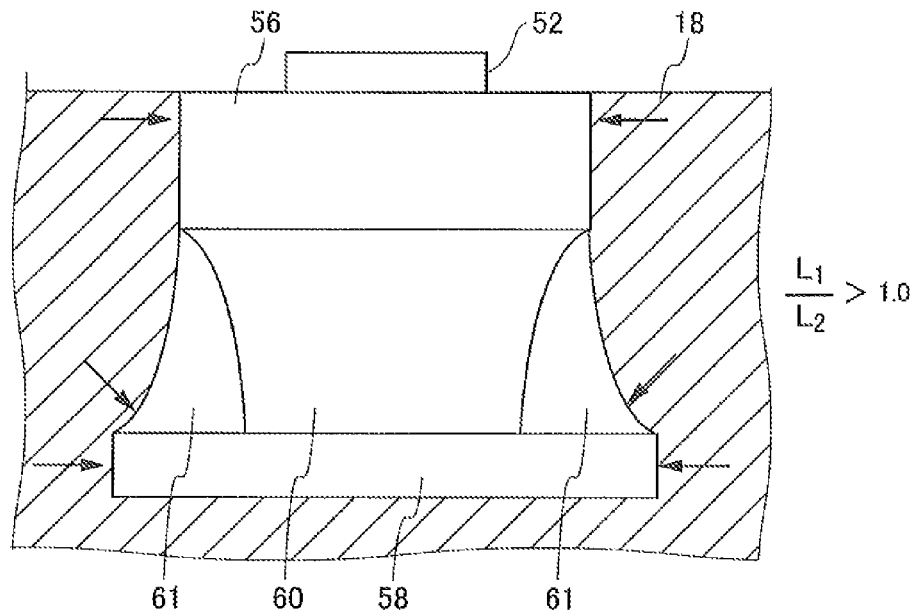
FIG. 6A is an explanatory diagram of the forces received by the stud pin from the tread rubber when the ratio $L_1/L_2$ is greater than 1.
Figure 6B:
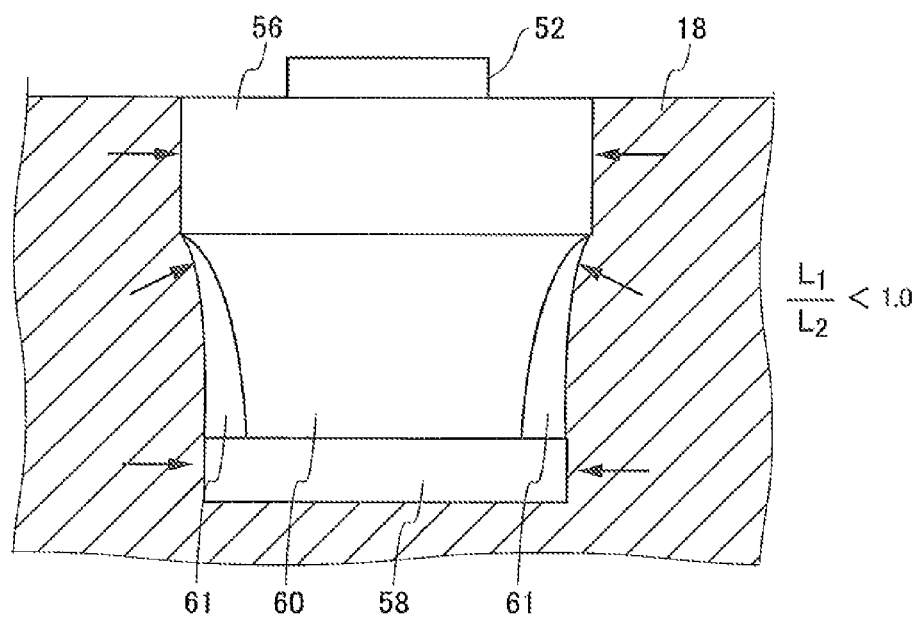
FIG. 6B is an explanatory diagram of the forces received by the stud pin from the tread rubber when the ratio $L_1/L_2$ is less than 1.

FIGS. 6A and 6B are explanatory diagrams of the forces of the tread rubber on the stud pin 50. When the stud pin 50 is embedded into the tread rubber material 18, the tread rubber is not embedded around the shank portion 60, creating a gap 61. The tread rubber material 18 creates a force acting in a direction orthogonal to the interface between the stud pin 50 or tread rubber material 18 in the gap 61 and the tread rubber material 18. Therefore, if the ratio $L_2/L_2$ is greater than 1.0, the tread rubber material surrounding the stud pin 50 tends to be subject to a force (the arrows in the drawing) oriented downward in the vicinity of the lower portion of the gap 61 as illustrated in FIG. 6A. Thus, if the ratio $L_1/L_2$ is greater than 1.0, the stud pin 50 is subjected to force oriented toward the inside of the tread rubber material 18 (the inside in the radial direction of the tire), strengthening the clamping force of the tread rubber material 18.

In contrast, if the ratio $L_1/L_2$ is less than 1.0, the tread rubber material surrounding the stud pin 50 tends to be subject to a force (the arrows in the drawing) oriented upward in the vicinity of the upper portion of the gap 61. Thus, if the ratio $L_1/L_2$ is less than 1.0, the stud pin 60 is subjected to a force oriented to the outside of the tread rubber material 18 (the outside in the radial direction of the tire), increasing the possibility of the stud pin 50 dropping out of the tread rubber material 18.

The ratio $L_2/L_3$ of the maximum width $L_2$ to the maximum width $L_3$ is preferably from 1.5 to 3.5, inclusive. The values which may satisfy the above mentioned numerical range for the ratio $L_2/L_3$ may be, for example $L_2$ in a range of 5.0 to 9.5 mm, and $L_3$ in a range of 1.5 to 4.2 mm. If the ratio $L_2/L_3$ is less than 1.5, the clawing force of the stud pin 50 on an icy surface overcomes the force of the tread rubber material 18 holding the stud pin 50, thus worsening the pin drop resistance of the stud pin 50. If the ratio $L_2/L_3$ is greater than 3.5, there is a smaller contact surface area between the tip end 52 and an icy surface, making it difficult to achieve a grip on the icy surface. The ratio $L_2/L_3$ is preferably from 2.0 to 3.0, inclusive.

Assume the direction in which the buried base 54 and the tip end 52 of the stud pin 50 is arranged is the height direction, the height from the under surface of the bottom portion 58 to the highest and topmost end of the tip end 52 is $H_1$, and the height from the under surface of the bottom portion 58th the top end of the bottom portion is $H_2$. The ratio $H_1/H_2$ of the height $H_1$ to the height $H_1$ is preferably 6.0 to 9.0. The values which may satisfy the above-mentioned numerical range for the ratio $H_1/H_2$ may be, for example, $H_1$ in a range from 9.5 to 11.5 mm, and $H_2$ in a range from 1.1 to 1.9 mm. If the ratio $H_1/H_2$ is less than 6.0, the clamping force on the stud pin 50 due to the tread rubber material 18 forming the side surface of the stud pin installation hole becomes too strong, and thus the stud pin 50 tends to bite into the inside of the tread rubber material 18 (the inside in the radial direction of the tire). As a result, the protruding length of the tip end 52 is shortened, thus reducing the clawing force of the tip end 52 on an icy surface. If, however, the ratio $H_1/H_2$ is greater than 9.0, the clamping force on the stud pin 50 due to the tread rubber material 18 is insufficient, and thus the pin drop resistance deteriorates. The ratio $H_1/H_2$ is more preferably from 7.0 to 8.0, inclusive. In general, the forces generated by the tread rubber material 18 to hold the stud pin 50 depends on the size of the flanges on the bottom portion 58 of the stud pin 50. The larger the diameter ($L_1$) of the flange, and the higher the height (H2) of the flange, the larger the force generated by the tread rubber material 18 to hold the stud pin 50. Therefore, the tip end 52 of the stud pin 50 tends retreat to inside the tread rubber material 18 (inside in the radial direction of the tire), thus reducing the clawing force of the tip end 52 on an icy surface. On the other hand, the smaller the diameter ($L_1$) of the flange, and the shorter the height ($H_2$) of the flange, the smaller the force generated by the tread rubber material 18 to hold the stud pin 50, thus increasing the possibility of the stud pin 50 dropping out of the tread rubber material 18.

At least one cavity 52a is formed on the outer peripheral surface along the outer peripheral surface of the tip end 52. The cavity 52a, and the second recess 56a and the first recess 58a are preferably provided at the same peripheral position as the outer peripheral surface of the buried base 56 to improve the pin drop resistance of the stud pin 50. Having "the same peripheral position" means that the difference in azimuth angle between any of the center position of a portion of the cavity 52a along the direction Y, the center position of the portion of the second recess 56a along the direction Y, and the center position of the portion of the first recess 58a along the direction Y is not greater than 5°.

Figure 7A:
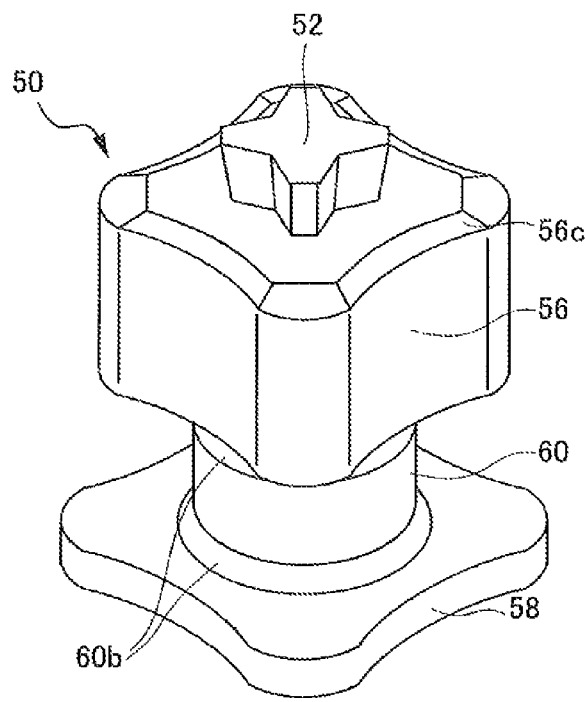
FIG. 7A is an external perspective view of the stud pin according to an embodiment different from the present embodiment.
Figure 7B:
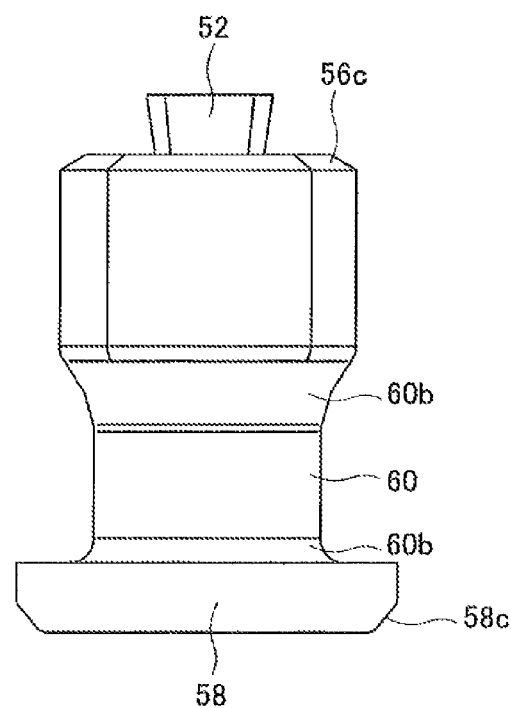
FIG. 7B is a side view of the stud pin illustrated in FIG. 7A.

FIG. 7A, FIG. 7B illustrate different embodiments of the stud pin 50. The stud pin 50 illustrated in FIG. 7A, FIG. 7B includes a tip end 52, and a buried base connected to the tip end similar to the embodiment illustrated in FIG. 3. The tip end 52 protrudes from the tread portion and makes contact with the road surface; and the buried base is embedded into the tread portion of a pneumatic tire into which the stud pin 50 is installed, and secures the stud pin 50 through pressure from the side surfaces of the stud pin installation hole. The buried base includes a trunk portion 56, and a bottom portion 58. The study pin 50 is provided with first recesses on and along the outer peripheral surface of the bottom portion 58 of the buried base; the outer peripheral portion of the stud pin makes contact with the side surface of the stud pin installation hole. Second recesses are formed on and along the outer peripheral surface of the trunk portion 56 on the buried base. The first recesses and the second recesses in the bottom portion 58 and in the trunk portion 56 respectively are provided at the same peripheral position on the outer peripheral surface in the circumferential direction Y of the buried base. Thus, the tread rubber material present in the recesses can more effectively deter movement of the stud pin 50 in the circumferential direction Y.

The buried base further includes a shank portion 60. The configurations of the bottom portion 58, the shank portion 60, and the trunk portion 56 are the same as in the stud pin 50 illustrated in FIG. 3 except that the corners are chamfered; therefore a description of the configurations is omitted. Additionally, the corners 58c, 60b, 56c of the bottom portion 58, the shank portion 60, and the trunk portion 56 respectively of the stud pin 50 in FIG. 7A are also chamfered. The chamfered corners 56c, 60b, 58c thus ensure that the stud pin 50 will not scrape the tread rubber surrounding the stud pin installation hole. Note that providing the chamfered corners 56c, 60b, 58c is not an absolute requirement.

Similarly to the stud pin 50 illustrated in FIG. 3, the tip end 52 protrudes from the tread surface. The difference between the tip end 52 in the present embodiment and the tip end 52 of the stud pin 50 illustrated in FIG. 3, is that the tip end 52 of the stud pin 50 illustrated in FIG. 3 has a constant cross-section when the tip end 52 extends from the portion connected to the trunk portion 56 toward the tip of the tip end 52. In contrast, the tip end 52 in the present embodiment has a shape that widens gradually when the tip end 52 in the present embodiment extends from the portion connected to the trunk portion 56 toward the tip of the tip end 52. That is, the surface of the tip on the tip end 52 is larger compared to the cross-section of the portion connecting the tip end 52 and the trunk portion 56. Thus, it is possible to increase the size of the surface of the stud pin 50 making contact with the road surface, and thus increase the clawing force of the stud pin 50. The tip end 52 may also have chamfered corners.

EXPERIMENT EXAMPLES

The tire 10 illustrated in FIGS. 1, 2 was manufactured and a stud pin according to the present embodiment was installed therein to test the effectiveness of the stud pin. The tire was mounted on a passenger vehicle; the braking performance on an icy surface was investigated in lieu of testing the tire performance on an icy surface. The pin drop resistance was also tested.

The manufactured tire was 205/55R16 sized tire. The passenger vehicle, was a 2000 cc front-wheel-drive passenger sedan. The internal tire pressure in both the front tires and the rear tires were 230 kPa. The weight for each tire was 450 kg for the front tires and 300 kg for the rear tires.

The distance (braking distance) from traveling at 40 km/h until the vehicle came to a stop after depressing the brake pedal to the furthest possible position at a constant force was measured multiple times (for example, five times); the average of the measured values was used to calculate the braking performance on an icy surface.

After the vehicle traveled for 1000 km at a constant speed on an asphalt, concrete, or other dry road surface, the ratio of the number of stud pins remaining in the tread portion to the total number of stud pins installed was calculated to determine the pin drop resistance of the stud pin. The inverse of the above mentioned average of the measured valued for the braking distance, and the ratio of the number of remaining stud pins were taken and indexed, with the inverse of the average of the measured values for the braking distance and the ratio of the number of remaining stud pins of the Conventional Example set as a reference (indexed at 100).

As illustrated in Tables 1 to 5, Working Examples 1 to 21, a Comparative Example, and a Conventional Example were evaluated.

No recesses were provided on the outer peripheral surfaces of the bottom portion 58 and the trunk portion 56 of the buried base 54 in the Conventional Example. In the Comparative Example, for instance, a second recess 56a was provided on the trunk portion 56, a first recess 58a was provided on the bottom portion 58, and cavities were formed in the tip end 52; however, the second recesses 56a and the first recesses 58a were not provided at the same peripheral position.

The tire structure illustrated in FIGS. 1, 2 for Working Examples 1 to 21, the Comparative Example, and the Conventional Example.

TABLE 1

|  | Working Example 1 | Working Example 2 | Comparative Example | Conventional Example |
| --- | --- | --- | --- | --- |
| First recess 58a, Second recess 56a at same or different position on the periphery? | Same | Same | Different | No recesses |
| Tip end Cavity 52, First Recess 58a, and Second Recess 56a at same or different position on circumference? | Different | Same | Different | No cavities |
| Ratio $L_1/L_2$ | 1.25 | 1.25 | 1.25 | 1.25 |
| Ratio $L_2/L_3$ | 2.5 | 2.5 | 2.5 | 2.5 |
| Ratio $H_1/H_2$ | 5.5 | 5.5 | 5.5 | 5.5 |
| Braking performance on ice | 110 | 113 | 103 | 100 |
| Pin Drop Resistance | 113 | 116 | 104 | 100 |

TABLE 2

|  | Working Example 3 | Working Example 4 | Working Example 5 | Working Example 6 |
| --- | --- | --- | --- | --- |
| Relationship between Radius of curvature $R_1$ and Radius of curvature $R_3$ | $R_1 < R_3$ | $R_1 > R_3$ | $R_1 < R_3$ | $R_1 > R_3$ |
| Relationship between Radius of curvature $R_2$ and Radius of curvature $R_4$ | $R_2 < R_4$ | $R_2 < R_4$ | $R_2 > R_4$ | $R_2 > R_4$ |
| Ratio $L_1/L_2$ | 1.2 | 1.2 | 1.2 | 1.2 |
| Ratio $L_2/L_3$ | 2.5 | 2.5 | 2.5 | 2.5 |
| Ratio $H_1/H_2$ | 5.5 | 5.5 | 5.5 | 5.5 |
| Braking performance on ice | 115 | 113 | 108 | 106 |
| Pin Drop Resistance | 116 | 112 | 114 | 110 |

TABLE 3

|  | Working Example 7 | Working Example 8 | Working Example 9 | Working Example 10 | Working Example 11 |
| --- | --- | --- | --- | --- | --- |
| Tip end Cavity 52, First Recess 58a, and Second Recess 56a at same or different position on circumference? | Same | Same | Same | Same | Same |
| Ratio $L_1/L_2$ | 1.0 | 1.1 | 1.3 | 1.5 | 1.6 |
| Ratio $L_2/L_3$ | 1.5 | 1.5 | 1.5 | 1.5 | 1.5 |
| Ratio $H_1/H_2$ | 6.0 | 6.0 | 6.0 | 6.0 | 6.0 |
| Braking performance on ice | 110 | 110 | 115 | 110 | 108 |
| Pin release resistance performance | 110 | 114 | 117 | 118 | 118 |

TABLE 4

|  | Working Example 12 | Working Example 13 | Working Example 14 | Working Example 15 | Working Example 16 |
| --- | --- | --- | --- | --- | --- |
| Tip end Cavity 52, First Recess 58a, and Second Recess 56a | Same | Same | Same | Same | Same |

TABLE 4-continued

|  | Working Example 12 | Working Example 13 | Working Example 14 | Working Example 15 | Working Example 16 |
|---|---|---|---|---|---|
| at same or different position on circumference? Tip end Cavity |  |  |  |  |  |
| Ratio $L_1/L_2$ | 1.25 | 1.25 | 1.25 | 1.25 | 1.25 |
| Ratio $L_2/L_3$ | 1.3 | 1.5 | 2.5 | 3.5 | 3.7 |
| Ratio $H_1/H_2$ | 6.0 | 6.0 | 6.0 | 6.0 | 6.0 |
| Braking performance on ice | 115 | 115 | 114 | 112 | 110 |
| Pin release resistance performance | 115 | 117 | 117 | 120 | 120 |

TABLE 5

|  | Working Example 17 | Working Example 18 | Working Example 19 | Working Example 20 | Working Example 21 |
|---|---|---|---|---|---|
| Tip end Cavity 52, First Recess 58a, and Second Recess 56a at same or different position on circumference? | Same | Same | Same | Same | Same |
| Ratio $L_1/L_2$ | 1.25 | 1.25 | 1.25 | 1.25 | 1.25 |
| Ratio $L_2/L_3$ | 2.5 | 2.5 | 2.5 | 2.5 | 2.5 |
| Ratio $H_1/H_2$ | 5.5 | 6.0 | 7.5 | 9.0 | 9.5 |
| Braking performance on ice | 113 | 114 | 118 | 120 | 120 |
| Pin Drop Resistance | 116 | 117 | 118 | 115 | 112 |

It can be understood from comparing the Comparative Example and the Working Examples 1, 2 in Table 1 that providing the first recess 58a and the second recess 56a on the outer peripheral surface at the same peripheral position on the bottom portion 58 and the trunk portion 56 of the buried base 54 respectively, improves the pin drop resistance and improves the braking performance on an icy surface.

Moreover, it can be understood on comparing the Working Examples 3 to 6, that satisfying the relationship $R_1 < R_3$, and $R_2 < R_4$ thereby improves the pin drop resistance and improves the braking performance on an icy surface. It can be understood that satisfying both relationships $R_1 < R_3$ and $R_2 < R_4$ in particular, improves the pin drop resistance and improves the braking performance on an icy surface.

According to a comparison of Working Example 7 through Working Example 11 in Table 3 that the pin drop resistance and the braking performance on an icy surface may be further improved when the ratio $L_1/L_2$ is greater than 1.0 and less than or equal to 1.5. Further, according to a comparison of the Working Example 12 through Working Example 16 in Table 4, the pin drop resistance and the braking performance on an icy surface may be further improved when the ratio $L_2/L_3$ is from 1.5 to 3.5, inclusive. Finally, according to a comparison of the Working Examples 17 through 21 in Table 5, the pin drop resistance and the braking performance on an icy surface may be further improved when the ratio $H_1/H_2$ is from 6.0 to 9.0, inclusive.

Stud pins and pneumatic tires according to embodiments of the present technology have been described above in detail; however, a pneumatic tire according to the present technology is not limited to the above mentioned embodiments, and may be modified and given various substitutions in accordance with the spirit and the scope of the technology.

What is claimed is:

1. A stud pin configured to be inserted into a stud pin installation hole in a tread portion of a pneumatic tire, the stud pin comprising:
a tip end protruding from the tread portion to make contact with a road surface; and
a buried base including a flanged bottom portion provided on an end opposite the tip end and extending in one direction; a flanged trunk portion provided between the bottom portion and the tip end; the buried base being embedded in the tread portion of the pneumatic tire in which the stud pin is installed, and pressure from a side surface of the stud pin installation hole on the bottom portion and the trunk portion securing the stud pin;
the bottom portion including a plurality of first recesses formed on and along an outer peripheral surface thereof that comes into contact with the side surface of the stud pin installation hole;
the trunk portion including a plurality of second recesses formed on and along an outer peripheral surface thereof that comes into contact with the side surface of the stud pin installation hole;
the first recesses provided on the bottom portion and the second recesses provided on the trunk portion being provided at a same peripheral position on the outer peripheral surface of the buried base; and
wherein a first projection is formed between the first recesses on the periphery of the outer peripheral surface of the bottom portion of the buried base, and a shape of the first projection along the bottom portion is a first arc having a radius of curvature of R1 larger than half $L_1$ of the bottom portion in a width direction orthogonal to the extending direction of the buried base.

2. The stud pin according to claim 1, wherein, at least one cavity is formed along the periphery of the outer peripheral surface of the tip end; and the cavity, the first recesses, and the second recesses are formed at the same peripheral position on the outer peripheral surface of the tip end and the outer peripheral surface of the buried base.

3. The stud pin according to claim 2, wherein a shape of the first recesses along the outer peripheral surface is a third arc, and a radius of curvature $R_3$ of the third arc is larger than the radius of curvature $R_1$ of the first arc.

4. The stud pin according to claim 3, wherein a length of the first recesses along the outer peripheral surface is greater than a length of the first projection along the outer peripheral surface of the buried base.

5. The stud pin according to claim 4, wherein a second projection is formed between the second recesses on the periphery on the outer peripheral surface of the trunk portion of the buried base, and a shape of the second projection along the trunk portion is a second arc having a radius of curvature of $R_2$ equivalent to half a maximum size of the trunk portion in the width direction orthogonal to the extending direction of the buried base or larger than half the maximum size.

6. The stud pin according to claim 5, wherein the shape of the second recesses along the outer peripheral surface is a fourth arc, and a radius of curvature $R_4$ of the fourth arc is larger than the radius of curvature $R_2$ of the second arc.

7. The stud pin according to claim 1, wherein a shape of the first recesses along the outer peripheral surface is a third arc, and a radius of curvature $R_3$ of the third arc is larger than the radius of curvature $R_1$ of the first arc.

8. The stud pin according to claim 1, wherein a length of the first recesses along the outer peripheral surface is greater than a length of the first projection along the outer peripheral surface of the buried base.

9. The stud pin according to claim 1, wherein a second projection is formed between the second recesses on the periphery on the outer peripheral surface of the trunk portion of the buried base, and a shape of the second projection along the trunk portion is a second arc having a radius of curvature of $R_2$ equivalent to half a maximum size of the trunk portion in a width direction orthogonal to the extending direction of the buried base or larger than half the maximum size.

10. The stud pin according to claim 9, wherein the shape of the second recesses along the outer peripheral surface is a fourth arc, and a radius of curvature $R_4$ of the fourth arc is larger than the radius of curvature $R_2$ of the second arc.

11. The stud pin according to claim 9, wherein a length of the second recesses along the outer peripheral surface is greater than a length of the second projections along the outer peripheral surface of the buried base.

12. The stud pin according to claim 1, wherein the maximum size $L_1$ of the bottom portion in the width direction orthogonal to the extending direction of the buried base is greater than a maximum size $L_2$ of the trunk portion in the width direction, and a minimum size $L_4$ of the bottom portion in a width direction orthogonal to the extending direction of the base is greater than a minimum size $L_5$ of the trunk portion in the width direction; and the maximum size $L_2$ of the trunk portion is greater than the minimum size $L_4$ of the bottom portion.

13. The stud pin according to claim 1, wherein a ratio $L_1/L_2$ of the maximum size $L_1$ of the bottom portion in a width direction to a maximum size $L_2$ of the trunk portion in the width direction is greater than 1.0 and less than or equal to 1.5, the width direction being orthogonal to the extending direction of the buried base.

14. The stud pin according to claim 13, wherein a ratio $L_2/L_3$ of the maximum size $L_2$ of the trunk portion in the width direction to a maximum size $L_3$ of the tip end in the width direction orthogonal to the extending direction of the buried base of the stud pin is not less than 1.5 and not greater than 3.5.

15. The stud pin according to claim 1, wherein upon the extending direction of the buried base of the stud pin being a height direction, a height from a bottom surface of the bottom portion of the buried base opposite the tip end is $H_1$, and a height from the bottom surface to a top end of the bottom portion is $H_2$, and a ratio $H_1/H_2$ of the height $H_1$ to the height $H_2$ is from 6.0 to 9.0.

16. A pneumatic tire comprising a tread portion provided with a stud pin installation hole and a stud pin installed in the stud pin installation hole, the stud pin comprising:
a tip end protruding from the tread portion to make contact with a road surface; and
a buried base including a flanged bottom portion provided on an end opposite the tip end and extending in one direction; a flanged trunk portion provided between the bottom portion and the tip end; the buried base being embedded in the tread portion of the pneumatic tire in which the stud pin is installed, and pressure from a side surface of the stud pin installation hole on the bottom portion and the trunk portion securing the stud pin;
the bottom portion including a plurality of first recesses formed on and along an outer peripheral surface thereof that comes into contact with the side surface of the stud pin installation hole;
the trunk portion including a plurality of second recesses formed on and along an outer peripheral surface thereof that comes into contact with the side surface of the stud pin installation hole; and
the first recesses provided on the bottom portion and the second recesses provided on the trunk portion being provided at a same peripheral position on the outer peripheral surface of the buried base; and wherein a first projection is formed between the first recesses on the periphery of the outer peripheral surface of the bottom portion of the buried base, and a shape of the first projection along the bottom portion is a first arc having a radius of curvature of R1 larger than half a maximum size $L_1$ of the bottom portion in a width direction orthogonal to the extending direction of the buried base.

17. The pneumatic tire according to claim 16, wherein the side surface of the stud pin installation hole abutting the bottom portion of the stud pin installation hole is a cylindrical curved surface along the periphery of the stud pin installation hole; and
a minimum size $L_4$ of the bottom portion in a width direction orthogonal to the extending direction of the buried base is greater than a diameter of the cylindrical shape of the curved surface abutting the bottom portion of the stud pin installation hole.

18. The pneumatic tire according to claim 16, wherein the side surface of the stud pin installation hole abutting the trunk portion of the stud pin installation hole is a cylindrical curved surface along the periphery of the stud pin installation hole; and
a minimum size $L_5$ of the trunk portion in a width direction orthogonal to the extending direction of the buried base is greater than a diameter of the cylindrical shape of the curved surface abutting the trunk portion of the stud pin installation hole.

* * * * *